United States Patent [19]

Parkinson

[11] Patent Number: 5,879,541
[45] Date of Patent: Mar. 9, 1999

[54] APPARATUS AND METHOD FOR REMOVING OIL FROM OIL-COATED PARTICLES

[75] Inventor: David John Parkinson, Bristol, United Kingdom

[73] Assignee: Merpro Tortek Limited, Angus, United Kingdom

[21] Appl. No.: 591,507

[22] PCT Filed: Aug. 31, 1994

[86] PCT No.: PCT/GB94/01889

§ 371 Date: May 31, 1996

§ 102(e) Date: May 31, 1996

[87] PCT Pub. No.: WO95/07325

PCT Pub. Date: Mar. 16, 1995

[30] Foreign Application Priority Data

Sep. 6, 1993 [GB] United Kingdom ............... 9318414
Dec. 8, 1993 [GB] United Kingdom ............... 9325160

[51] Int. Cl.$^6$ ........................................ C10G 1/00
[52] U.S. Cl. .................... 208/425; 206/424; 202/175; 159/DIG. 3; 159/27.2; 196/23; 422/261; 134/22.18
[58] Field of Search .................... 208/187, 425; 202/175; 159/27.2; 196/123; 422/261, 267; 134/22.18

[56] References Cited

U.S. PATENT DOCUMENTS

| | | | |
|---|---|---|---|
| 3,642,129 | 2/1972 | McDaniel et al. | 422/261 |
| 3,709,292 | 1/1973 | Palmour | 166/68 |
| 3,802,501 | 4/1974 | Mecusker et al. | 166/75 |
| 4,243,528 | 1/1981 | Hubbard et al. | 210/104 |
| 4,518,458 | 5/1985 | Greenfield et al. | 159/47 |
| 4,722,781 | 2/1988 | Swartz et al. | 208/187 |
| 4,952,099 | 8/1990 | Drobadenko | 406/50 |
| 4,978,251 | 12/1990 | Drobadenko et al. | 406/50 |
| 5,129,468 | 7/1992 | Parmenter | 175/66 |

*Primary Examiner*—Helane Myers
*Attorney, Agent, or Firm*—Andrus, Sceales, Starke & Sawall

[57] ABSTRACT

Particles of sand coated with oil are loaded into a housing (1). A fluidizing unit (3) is provided towards the bottom of the housing. The fluidizing unit fluidizes the particles and discharges them from the housing to a separator, such as one or more hydrocyclones (8, 14), in which the oil and sand particles are separated. The coated particles can be introduced in the housing (1) via a cyclonic separator (50, 52) which provides some preliminary separation.

30 Claims, 5 Drawing Sheets

APPARATUS AND METHOD FOR REMOVING OIL FROM OIL-COATED PARTICLES

BACKGROUND OF THE INVENTION

The production fluid from an oil well includes varying proportions of oil, water and gas in which are entrained solid particles, hereinafter referred to as "sand". This mixture is normally fed to a phase separator in which settling under gravity occurs into an upper gaseous layer, a middle oil layer, and an lower water layer. These are removed through separate outlets from the separator. The sand naturally settles out in the bottom of the water layer in the tank and it will be undesirable to allow this to be discharged through the water outlet, not least because the sand particles will be coated with oil and it is unacceptable to discharge such coated particles with the water back into the environment. Consequently the coated sand particles are recovered from the bottom of the phase separator and, according to one method, supplied to a vessel fitted with impellers which rotate in opposite directions to suspend the contaminated particles in water, causing dynamic contact of the particles, which mechanically strips away the oil coatings from the solid particles. The clean solid particles may then be discharged to the environment but the carrier water has to be treated, normally by flotation, to remove the oil. This is difficult, costly, and takes space which is at a premium on, for example, a marine platform.

Other situations obtain where it is necessary to clean oil-coated sand particles, for example when an oil spillage contaminates a beach.

SUMMARY OF THE INVENTION

According to the present invention, a method for separating oil from particles coated with oil comprises loading the coated particles into a housing containing a fluidising unit which has a liquid supply duct with an outlet and arranged to be fed with water under pressure from outside the housing, and a discharge duct within the liquid supply duct having at its end an inlet projecting beyond the outlet of the liquid supply duct, the discharge duct leading to a separator; feeding water to the liquid supply duct and causing it to swirl at the outlet such that it disturbs the oil and sand particles to cause the oil to be stripped, at least partially, from the particles, and causes the oil and sand particles entrained in the water to travel into the discharge duct and hence to a separator, where the oil, water and solid particles undergo separation.

The fluidising unit creates a swirling vortex which violently strips oil from the sand particles and also discharges the oil, water and sand without the need for any moving parts in contact with the separated components.

Although the method may be used for example, for cleaning sand from a contaminated beach after an oil spill, or for cleaning drilling mud, so that the mud is clean enough to be dumped, it is particularly useful for treating the oil-coated sand sedimented in a three phase separator for separating the components of the production fluid from an oil well. Alternatively, the contaminated sand in the production fluid may be treated by the method after settlement of the contaminated sand from the production fluid prior to its entry into the three phase separator. In these cases, the water fed to the liquid supply duct of the fluidising unit is preferably taken from the water outlet of the phase separator. This has the advantage that the water will still be at a comparatively high temperature, which will promote the stripping of the oil coating from the sand particles.

The separator may include a centrifuge or a single hydrocyclone stage which is arranged such that the oil is substantially separated and reports to the overflow and the water and sand report to the underflow. However, to improve the separation, two hydrocyclone stages are preferably provided, the first of which is a liquid/solid separation hydrocyclone, which substantially separates sand, which reports to the underflow from oil and water which report to the overflow, and the second of which is a liquid/liquid separation hydrocyclone, which substantially separates water which reports to the underflow from oil which reports to the overflow. The use of hydrocyclones generates sufficient centrifugal forces to cause further scrubbing of the oil from the sand particles.

The efficiency of solid/liquid separation hydrocyclones is critically dependent upon the density of slurry fed to the hydrocyclone inlet. The present invention, utilising the special fluidising unit, is particularly suitable for maximising the efficiency of a solid/liquid separation hydrocyclone in the separator because the density of the slurry discharged through the discharge duct of the fluidising unit can be accurately controlled by fine tuning the parameters of the fluidising unit. The particular parameters which are either preset for a particular system, or are adjustable to accommodate changing conditions are the pressure/flow of the water fed to the liquid supply duct of the fluidising unit, and the axial separation of the outlet of the liquid supply duct and the inlet of the discharge duct of the fluidising unit.

One aspect of the invention includes an apparatus for carrying out the method according to the present invention, the apparatus comprising a housing having an inlet for oil-coated sand particles, the housing containing a fluidising unit which has a liquid supply duct with an outlet and arranged to be fed with water under pressure from outside the housing, and which has a discharge duct within the liquid supply duct and having at its end an inlet projecting beyond the outlet of the liquid supply duct, the discharge duct leading to a separator comprising a liquid/solid separation hydrocyclone, the overflow outlet of which leads to a liquid/liquid separation hydrocyclone.

A further aspect of the invention includes an apparatus for carrying out the method according to the present invention, the apparatus comprising a housing having an inlet for oil-coated sand particles, the housing containing a fluidising unit which has a liquid supply duct with an outlet and arranged to be fed with water under pressure from outside the housing, and which has a discharge duct within the liquid supply duct and having at its end an inlet projecting beyond the outlet of the liquid supply duct, the discharge duct leading to a separator; and a three phase separator, to which an overflow from the housing leads. This apparatus is suitable for use with the method which treats the production fluid prior to its entry into the three phase separator. The separator may be a centrifuge, or a solid/liquid hydrocyclone, the overflow of which leads to the three phase separator. Water from the three phase separator may be supplied to the liquid supply duct of the fluidising unit. In order to improve the settlement of sand within the housing, the inlet for oil-coated sand particles preferably leads to a cyclonic separator, the underflow of which discharges sand with some associated fluids to a lower portion of the housing, and the overflow of which discharges oil and water, substantially free of sand, to an upper part of the housing.

This arrangement forms an independent aspect of the present invention which may be defined as a separator for separating solid particles from a mixture containing solid particles and a fluid component, such as a production fluid containing sand particles, the separator comprising a housing having an inlet for the mixture and a separated fluid outlet associated with an upper part of the housing; the inlet for the mixture leading to a cyclonic separator such that the mixture is caused to swirl in the cyclonic separator, the cyclonic separator having an overflow for the discharge of fluids to an upper part of the housing, and an underflow for the discharge of solid particles and some fluid to a lower part of the housing; and, associated with the lower part of the housing, a fluidising unit which has a liquid supply duct with an outlet and arranged to be fed with liquid under pressure from outside the housing, and which has a discharge duct within the liquid supply duct and having at its end an inlet projecting beyond the outlet of the liquid supply duct.

A plurality of baffles may be provided in the housing to provide a tortuous path to the upper part of the housing for any fluid discharged from the underflow of the cyclonic separator, and which deter any solid particles discharged from the underflow of the cyclonic separator from reaching the upper part of the housing. If the mixture is, for example, a production fluid which forms a gas core in the cyclonic separator, then it is advantageous to provide a gas overflow outlet positioned on the axis of the cyclonic separator.

Alternatively the housing of the separator is formed as a pressure vessel; and the cyclonic separator is at least one hydrocyclone, the underflow outlet or outlets of which discharge(s) into a closed underflow chamber of the pressure vessel, in which chamber the fluidising unit is provided.

If there is a bank of more than one hydrocyclone within the pressure vessel, the inlet for the mixture to the vessel may open into an inlet chamber and the overflow outlets of the hydrocyclones may open into an overflow chamber, the inlet and overflow chambers being sealed from one another and from the underflow chamber.

By its nature, the hydrocyclone provides a pressure drop from its inlet to its underflow and overflow outlets, the pressure drop to the overflow outlet in a solid/liquid separating cyclone, normally being greater than that between the inlet and underflow chambers. Consequently, and according to a preferred aspect of the invention, an upper part of the underflow chamber is connected to an overflow outlet from the vessel in order that any gas or oil carried through the hydrocyclone underflow into the underflow chamber flows to and is entrained by the fluids leaving the overflow outlet for fluids from the vessel.

A further advantage of the pressure drop between the production fluid inlet pressure and the pressure obtaining in the underflow chamber may be obtained by driving the fluidising unit with the inlet pressure, that is by connecting the supply duct of the fluidising unit to a mixture inlet line to the vessel so that a side stream of the mixture drives the fluidising unit. In this way a small proportion of the excess pressure in the mixture is used up in driving the fluidising unit, without the need for any separate pressure source.

Fluidising units of a type suitable for use in any aspect of the present invention are disclosed in our earlier U.S. Pat. Nos. 4,978,251, 4,952,099 and 4,992,006. The fluidising unit is capable of removing particles on line, without the need to depressurise the housing.

The fluidising units of any aspect of the present invention may be orientated with the liquid supply duct and discharge duct opening downwardly. Alternatively, the fluidising unit may be orientated with the liquid supply duct and the discharge duct opening upwardly. In this case, it is preferable to close the gap between the liquid supply duct unit is not in use. The gap can be closed by a valve which may be biased closed and forced open by liquid in the liquid supply duct, or by the liquid supply duct being movable with respect to the discharge duct to close the gap.

In any aspect of the present invention the swirl of the liquid at the outlet of the liquid supply duct may be caused by inclined vanes in the liquid supply duct, and/or by the liquid supply duct having a tangential inlet into a cylindrical chamber upstream of the liquid supply duct outlet.

In the fluidising unit used with any aspect of the present invention, a jet pump can be provided on the discharge duct to boost the pressure in the discharge duct. When the discharge duct leads to a cyclone separator, the liquid supplied to the jet pump can be controlled to control the liquid/solid ratio to that required by the cyclone separator.

In any aspect of the present invention, to enhance further the scrubbing of the oil from the sand particles, chemicals may be added to the liquid which is fed to the liquid supply duct of the fluidising unit.

In any aspect of the present invention, in order to accommodate varying sand loads, the amount of sand in the housing may be sensed, for example using a vibrating probe to sense the level of sand or a load cell to sense the mass of sand, so that the fluidising unit can be operated when the amount of the sand within the housing reaches a threshold value.

By removing abrasive particles by any aspect of the is present invention, expensive upstream equipment and valves are protected from abrasive damage.

BRIEF DESCRIPTION OF THE DRAWING

Examples of systems employing the method of the present invention will now be described with reference to the accompanying drawings, in which.

Figure 1:
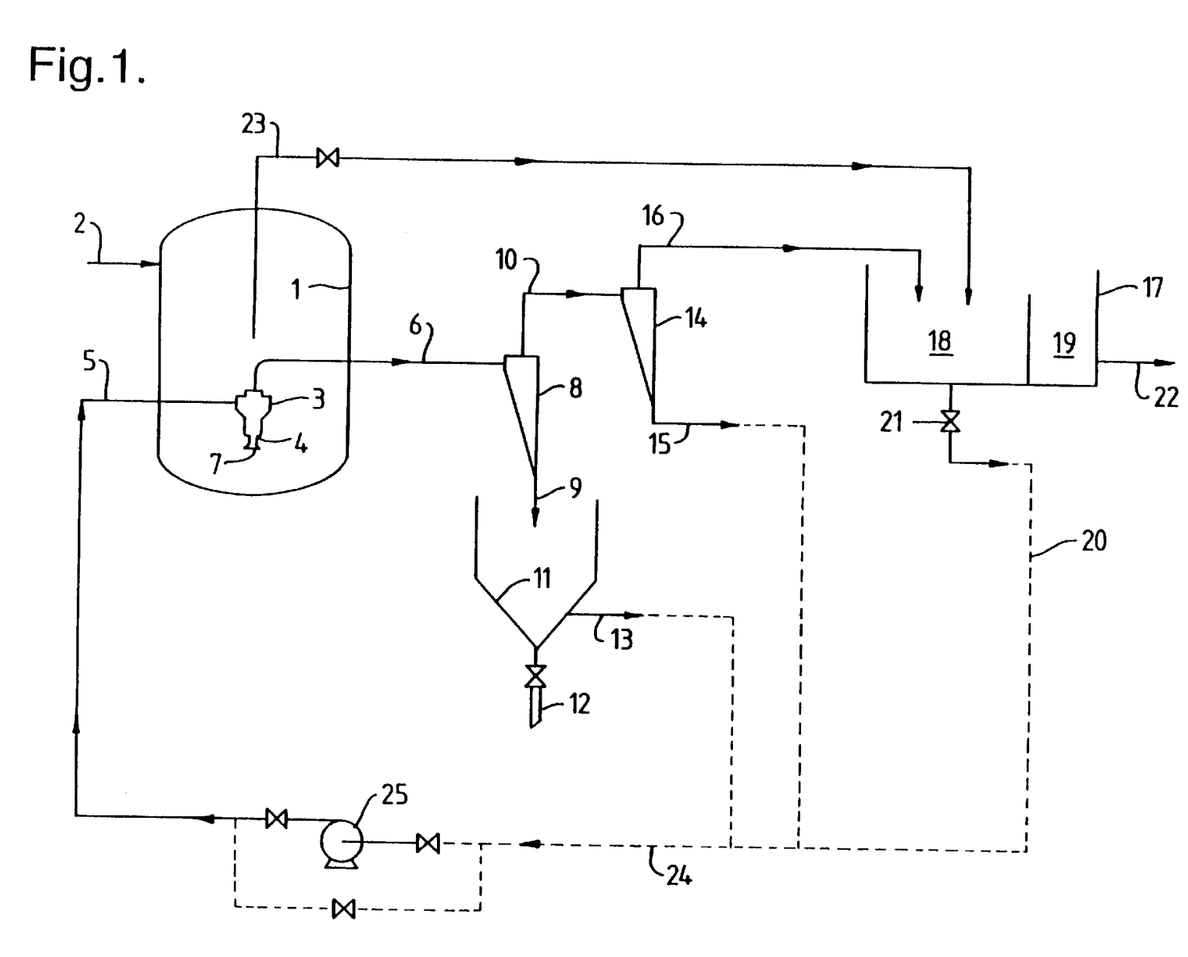
FIG. 1 is a schematic diagram of a first system.

In FIG. 1, a housing 1 has an inlet 2 for sand contaminated with oil.

DETAILED DESCRIPTION OF THE PREFERRED EMBODIMENTS

A fluidising unit 3 is provided within the housing 1. The unit has a liquid outlet 4 which is fed with water by a liquid supply duct 5. The liquid supply duct 5 is provided with means such as inclined vanes (not shown) for swirling the liquid discharged from the liquid outlet 4. A discharge duct 6 is located within and is coaxial with the liquid supply duct 5. The discharge duct 6 terminates in an inlet 7 which projects beyond the liquid outlet 4.

The discharge duct 6 leads to a first hydrocyclone stage 8 which is arranged to separate sand at its underflow 9 from oil and water at its overflow 10. The hydrocyclone stage 8 has one or more solid/liquid hydrocyclones typically constructed of polypropylene or a ceramic material. The sand from the underflow 9 is discharged into a container 11 from which it can be discarded through a nozzle 12. Excess water can be drained through a second nozzle 13. The oil and water from the overflow 10 of the first hydrocyclone 8 are fed to a second hydrocyclone stage 14 where the water at the underflow 15 is separated from the oil at the overflow 16. The second hydrocyclone stage 14 has one or more liquid/liquid hydrocyclones of the type described in GB 2221408. The hydrocyclones 8,14 may be fitted with ceramic components at points of high erosion potential.

The oil from overflow 16 will still contain some water. It is therefore fed to a tank 17 having first 18 and second 19 chambers. The first chamber has a water discharge line 20 the flow through which is controlled by a valve 21. The second chamber 19 has an oil discharge line 22. An overflow line 23 leads from the housing 1 to the first chamber 18 of the tank 17.

A water recycling system 24 is provided with a pump 25 which receives water from nozzle 13, underflow 15 and water discharge line 20 and pumps it to the liquid supply duct of the fluidising unit 3.

In use, the sand particles contaminated with oil are loaded into the housing 1 through the inlet 2. Once there is sufficient contaminated sand in the housing 1, the fluidising unit 3 is activated. This involves supplying water under pressure to the liquid supply duct 5. The water is caused to swirl as it leaves the liquid outlet 4 thereby generating a precessing vortex core directly under the inlet 7 of the discharge duct 6. The precessing vortex core causes violent pulsating forces which both fluidise and mix the contaminated sand in the zone of influence of the core. The mixing action causes the sand particles to contact each other with sufficient energy to scrub away some or all of the oil coating from the sand. Typically, about half of the water fed to the fluidising unit 3 is discharged through the discharge duct 6 with the sand particles while the rest of the water remains in the housing 1 in place of the discharge sand. The addition of appropriate chemicals to the liquid supply duct 5 facilitates this scrubbing action. The precessing vortex core causes the sand and oil entrained in the water to be discharged from the housing through discharge duct 6.

The oil, sand and water from the discharge duct 6 encounter the first hydrocyclone stage 8 where the sand is separated from the oil and water and reports to the underflow 9. The oil and water report to the overflow 10 and encounter the second hydrocyclone stage 14 wherein the water reports to the underflow 15 and the oil is discharged through overflow 16 to the first chamber 18 of tank 17. The valve 21 remains closed until the fluids in the first chamber 18 reach a level to allow the upper layer of oil to flow into the second chamber 19. The valve 21 can be operated automatically using a level control which detects the position of the water-oil interface within the first chamber 18. The oil in the second chamber 19 is discharged through line 22 for recovery. The water from the first chamber 18 is discharged through line 20 on opening of the valve 21 and may be fed to the liquid supply duct 5 of the fluidising unit 3 through water recycling system 24, driven by pump 25.

Figure 2:
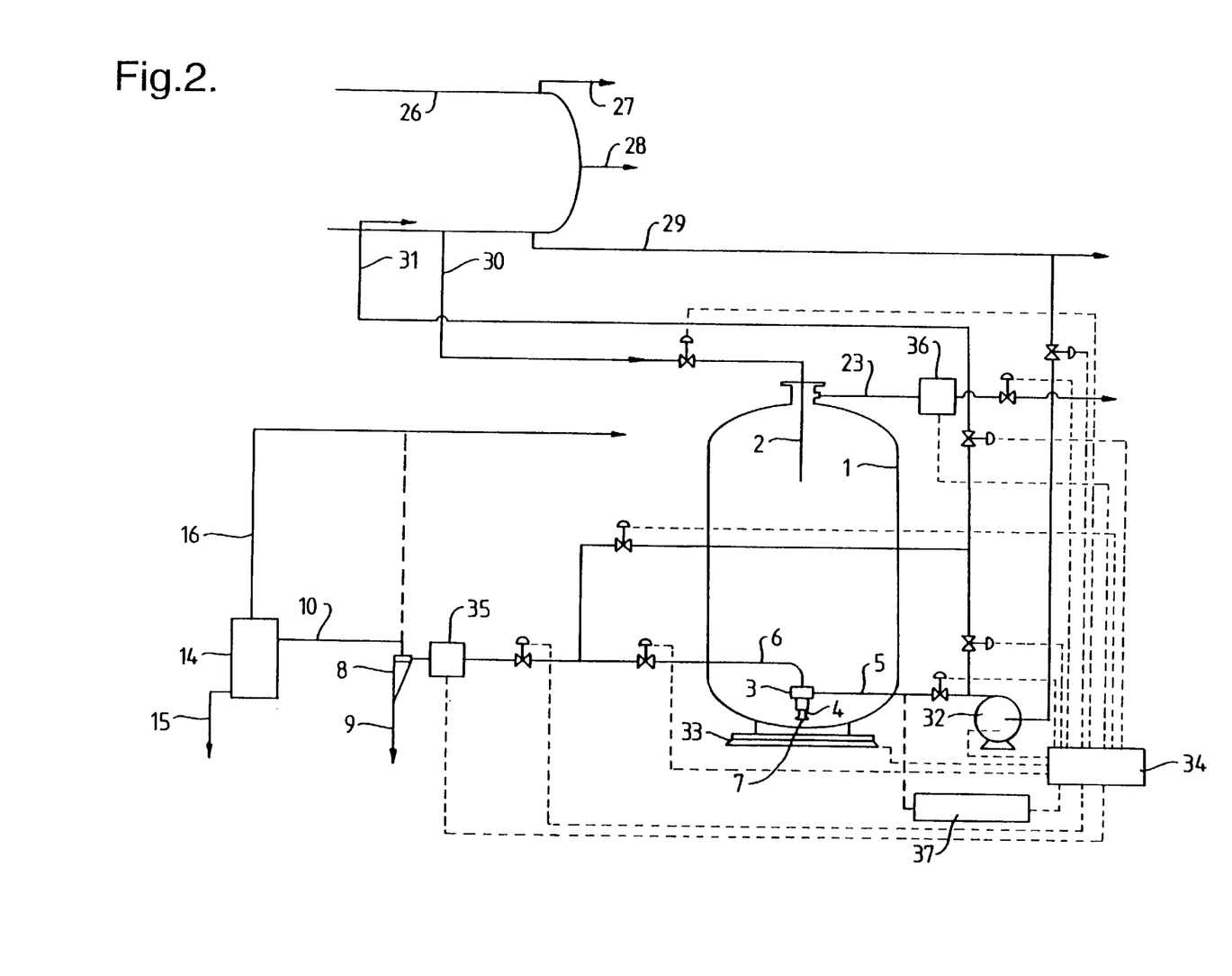
FIG. 2 is a schematic diagram of a system in which the first system is used for de-oiling sand from a phase separator.

FIG. 2 shows the system of FIG. 1 being used to de-oil sand extracted from a three phase separator 26. Such a phase separator may be used to separate fluids from an oil well which are contaminated with sand. The sand will tend to settle to the bottom of the separator 26 thereby reducing the effective volume and clogging the ports of the phase separator. The sand which is removed will be contaminated with oil.

The phase separator 26 has conventional gas 27, oil 28 and water 29 outlets. In addition, an outlet 30 leading to housing 1 is provided for the contaminated sand which has settled on the bottom of the tank. A water inlet 31 which allows water into the phase separator 26 in order to flush out the sand and oil through outlet 30 is connected to a pump 32.

A load cell 33 detects the mass of the contents of housing 1 and outputs a signal to a controller 34 which gives an indication of the amount of sand in the housing 1. The load cell 33 could equally be replaced by a vibrating probe sensor within the housing 1 to detect the level of sand within the housing 1.

The controller 34 receives additional signals from first 35 and second 36 flow sensors, which detect abnormal flow conditions in the system, and sends signals to a plurality of valves, the pump 32 and a chemical dosing unit 37 in a manner to be described. The remainder of the system is as described with reference to FIG. 1.

The size of the fluidising unit used and the length of time for which it is run depends on the content of sand within the oil. For example, in an oil field where the sand load is light (less than 0.5 tonnes/day), a fluidising unit having an inlet 7 with a 25 mm bore may typically be run for about two hours a week. Where the sand load is medium (up to 20 tonnes/day) the same fluidising unit is typically run for twelve hours a day. Where the sand load is heavy (greater than 20 tonnes/day) a fluidising unit in which the inlet 7 has a 50 or 75 mm bore might be run for up to twelve hours a day.

In order to remove the sand from the phase separator 26, the pump is run at a first speed to pump water through the line 31 to flush out the contaminated sand from the bottom of the phase separator 26 through outlet 30 and into the housing 1. The heavy sand sinks to the bottom of the housing 1, while the oily water overflows through the overflow line 23 to a slop tank, or for further treatment. As the housing 1 fills with sand and the oily water is displaced, the overall mass increases. The increasing mass is sensed by the load cell 33 or the increasing level of sand is sensed by a vibrating probe, and, when the amount reaches a threshold value, the controller 34 shuts off the supply of water from the pump 32 to the phase separator 26 so that the flushing operation is terminated. The pump 32 is then run at a second speed which is lower than the first speed to pump water to the liquid supply duct 5 of the fluidising unit 3. This causes the contaminated sand to be scrubbed and removed from the housing 1 and separated as described with reference to FIG. 1. If the sand load is unusually light, the amount may not reach the threshold value, in which case, the flushing operation will be terminated by a timer.

As the fluidising unit 3 discharges the sand from the housing 1, the amount of sand within the housing will fall until a value is detected indicating that there is no sand present within the housing, at which point the system will be shut down until the cleansing of the separator 26 is required again.

In place of the double hydrocyclone stage 8,14 shown in FIG. 2. It is possible to use a single hydrocyclone stage in which the oil reports to the overflow and the water and sand report to the underflow.

Figure 3:
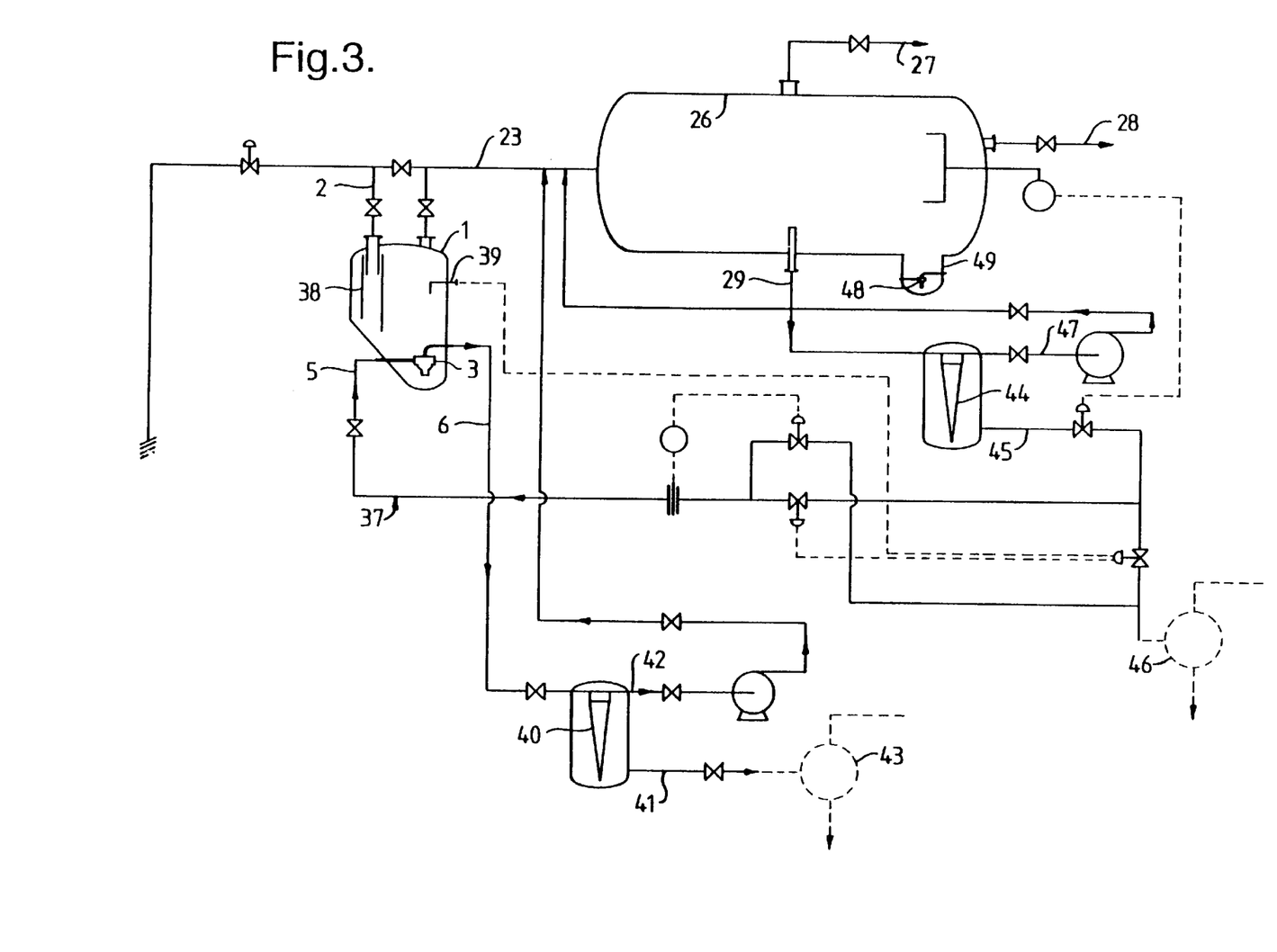
FIG. 3 is a schematic diagram of a system in which a modified version of the first system is used for de-oiling sand to a phase separator.

FIG. 3 shows a system for removing the bulk of the sand, for example, particles having a diameter of more than 0.1 mm, from the production fluid of an oil well before it enters a three phase separator. This system includes a system similar to that shown in FIG. 1 although it is only shown with a single hydrocyclone stage, the overflow of which leads to the inlet of the three phase separator instead of the tank.

The production fluid from the oil well enters a sand trap 38 in the housing 1. The contaminated sand settles to the bottom of the housing, while the liquid part of the production fluid overflows from the housing 1 through overflow 23 which leads to the inlet of the three phase separator 26. A detector 39 detects when the level of sand in the housing is at a predetermined level and the fluidising unit 3 is operated in the same manner as described with reference to FIG. 1. The discharge duct 6 of the fluidising unit 3 leads to a first hydrocyclone 40 which separates the sand and water, which report to the underflow 41 from the oil and some water which report to the overflow 42. The clean sand and water from the underflow 41 encounter a degas stage 43 before being dumped. The oil and water from overflow 42 are pumped back to the inlet of the three phase separator 26.

Water taken from the water outlet 29 of the three phase separator 26 is fed to liquid/liquid hydrocyclone 44, and the cleaned water from the underflow 45 is fed to the liquid supply duct, after being supplied with the appropriate chemicals from chemical dosing unit 37. If the fluidising unit 3 is not being run, the operation of appropriate valves ensures that the water from the underflow 45 is not supplied to the liquid supply duct 5, but is instead dumped after encountering degas stage 46. Oil containing a water component is discharged from the outlet 47 of the hydrocyclone 44 and is pumped to the inlet of the three phase separator 26.

A second fluidising unit 48 which operates in the same way as the fluidising unit 3, previously described, is provided in a trap 49 in the bottom of the three phase separator 26. This unit 48 operates in the same way as the fluidising unit 3 previously described, and is used to clean the three phase separator 26 during normal shut downs, or, if for some reason sand is carried over into the three phase separator 26 from the housing 1. The contaminated sand removed by the second fluidising unit 48 is dealt with in the same way as that from the first fluidising unit 3.

Figure 4:
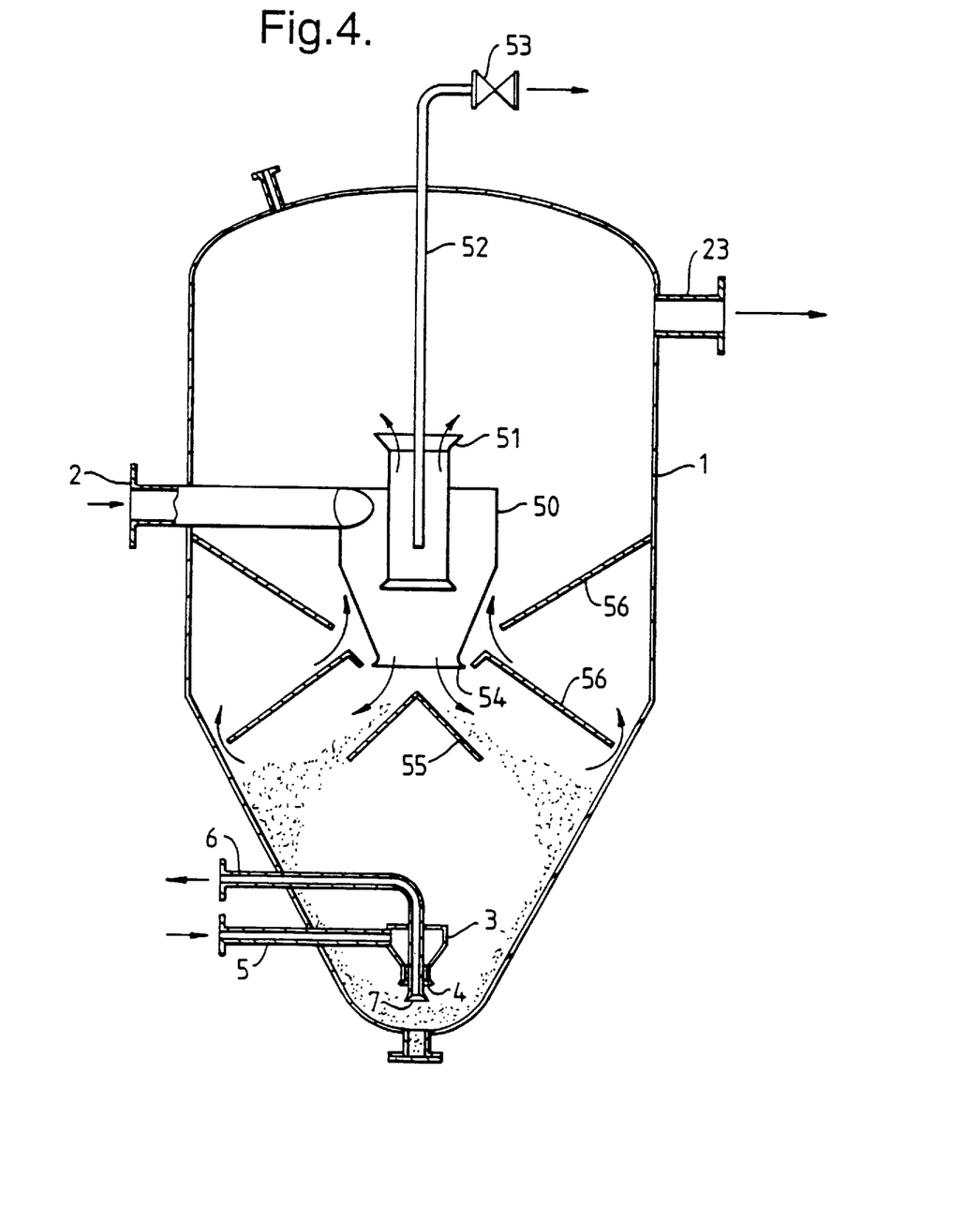
FIG. 4 is an axial section of a housing including a sand trap which is a modified version of that shown in FIG. 3.

A modified version of the sand trap 38 is illustrated in FIG. 4. This shows a housing 1 having a fluidising unit 3 and an overflow line 23 as shown in the previous examples.

The inlet 2 for production fluid leads tangentially to a cyclonic separator 50 such that the production fluid is caused to swirl. The cyclonic separator 50 has an overflow 51 for oil, gas and some water. A second overflow 52 is provided for gas which forms in core at the axis of the cyclonic separator 50. A choke valve 53 controls the outlet of the gas. This gas will be quite wet and will therefore require a gas dehydration device to remove liquids prior to the gas being set to flare. Any liquids removed are sent to the three-phase separator 26.

The underflow 54 of the cyclonic separator discharges the majority of the sand together with some water, oil and gas towards a lower part of the housing 1. A baffle 55 distributes the sand, which is thrown outwards by the swirling action in the cyclonic separator 50, around the lower part of the housing 1. A series of further baffles 56 create a tortuous path through which any water, oil or gas from the underflow 54 flows back to the top part of the housing 1. This tortuous path deters the sand from migrating to the top of the housing.

Figure 5:
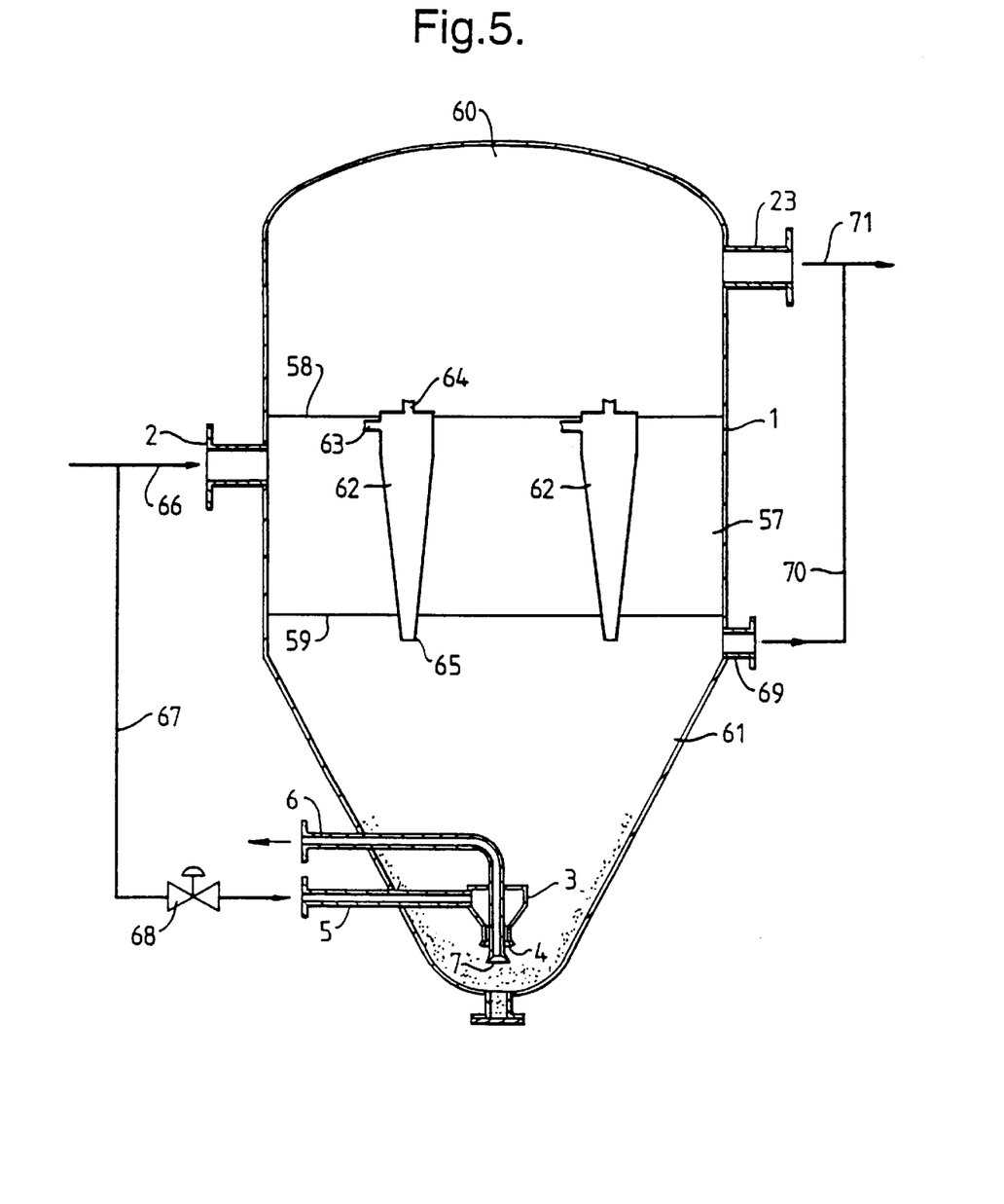
FIG. 5 is an axial section of a housing including a sand trap which is a modified version of that shown in FIG. 3.

As shown in FIG. 5 a pressure vessel 1 has an inlet 2 for production fluid, leading into an inlet chamber 57 which is sealed by walls 58 and. 59 from an overflow chamber 60 having an outlet 23, and an underflow chamber 61. Supported by the walls 58 and 59 are a bank of hydrocyclones 62, of which only two are shown. Each has its inlet 63 open to the chamber 57, its overflow outlet 64 discharging into the chamber 60, and its underflow outlet 65 discharging into the chamber 61. The hydrocyclones 62 are designed primarily to separate sand from fluid, the majority of the fluid passing into the overflow chamber 60 and out of the outlet 23 whilst the majority of the sand with some fluid, including water, oil and gas passes into the underflow chamber 61 where the sand sediments in the bottom of the chamber 61. From here it may be continuously or intermittently discharged by means of a fluidising unit 3 similar to that shown in FIG. 4.

The primary production fluid supplied to the inlet 2 is via a main line 66. A branch 67 is taken off this line and is connected to the liquid supply duct 5 via a control valve 68 to drive the fluidising unit.

Inevitably some gas and oil will collect in the top of the underflow chamber 61 and as this chamber will be at a somewhat higher pressure than obtaining in the outlet chamber 60 and outlet 23, it may be removed via an outlet 69 connected via a line 70 to the main outlet line 71 leaving the outlet 23. In this way the chamber 61 can be purged of lighter fluids, heavier fluid, particularly water, being discharged through the discharge duct 7 from the fluidising unit 3.

I claim:

1. A method for removing oil from particles coated with oil, the method comprising the steps of:

loading a slurry of coated particles into a housing (1) containing a fluidizing unit which has an axis, a liquid supply duct (5) with an outlet (4), and a discharge duct (6) extending through said liquid supply duct so that said liquid supply duct surrounds a portion of said discharge duct, the liquid supply duct having at its end an inlet (7), the outlet of the liquid supply duct and the inlet of the discharge duct being axially separated in the fluidizing unit;

selecting the amount of axial separation of the liquid supply duct outlet and the inlet of the discharge duct in accordance with a desired slurry density for a discharge of the fluidizing unit;

selecting flow characteristics for water fed to the liquid supply duct in accordance with a desired slurry density for a discharge of the fluidizing unit; and feeding water to the liquid supply duct under pressure from outside the housing in accordance with the selected flow characteristics and causing it to swirl at the outlet to create a vortex which disturbs the oil and particles to cause the oil to be stripped, at least partially, from the particles loaded in the housing, and causes the oil and particles entrained in the water to travel into the discharge duct as a discharge slurry of the desired density, the slurry being comprised of the solid particles, the oil stripped from the particles, and the water; and supplying the discharge slurry to a separator where the oil, water, and solid particles undergo separation, the separation efficiency of the separator being slurry density dependent and the selection of the axial separation and flow characteristics being such as to establish the discharge slurry density at that which provides a desired separation efficiency of the separator.

2. A method according to claim 1, wherein the selecting steps are further defined as selecting the outlet-inlet axial separation and flow characteristics to establish the discharge slurry density at that which maximizes the separation efficiency of the separator.

3. A method according to claim 1, wherein the supplying step is further defined as supplying the discharge slurry to a liquid/solid hydrocyclone separator (40) which substantially separates sand and water which report to an underflow (41) from oil and water which report to an overflow (42).

4. A method according to claim 1, wherein the step of supplying the discharge slurry to a separator is further defined as supplying the discharge slurry to a separator comprised of two hydrocyclone stages (8, 14), the first of which is a liquid/solid separation hydrocyclone stage (8) which substantially separates sand, which reports to an underflow (9) from oil and water which report to an overflow, and the second of which is a liquid/liquid separation hydrocyclone stage (14), which substantially separates water which reports to an underflow (15) from oil which reports to an overflow (16).

5. A method according to claim 1, wherein the step of causing the water to swirl at the outlet of the liquid supply duct is further defined as deflecting the water by inclined vanes in the liquid supply duct.

6. A method according to claim 1, wherein the step of causing the water to swirl at the outlet of the liquid supply duct is further defined as tangentially feeding the water into a cylindrical chamber of the fluidizing unit upstream of the liquid supply duct outlet.

7. A method according to claim 1, further defined as including the step of adding chemicals to the water which is fed to the liquid supply duct of the fluidizing unit.

8. A method according to claim 1, further defined as sensing the amount of particles contained in the housing and operating the fluidizing unit when the amount of particles reaches a threshold value.

9. An apparatus for removing oil from particles coated with oil, said apparatus comprising:
   a housing (1) for receiving a slurry of coated particles, said housing containing a fluidizing unit (3) which has an axis, a liquid supply duct (5) with an outlet (4), and a discharge duct (6) extending through said liquid supply duct so that said liquid supply duct surrounds a portion of said discharge duct, the liquid supply duct having at its end an inlet (7), the outlet of the liquid supply duct and the inlet of the discharge duct being axially separated in the fluidizing unit by an amount selected in accordance with a desired slurry density for a discharge of the fluidizing unit, water being fed to the liquid supply duct under pressure from outside the housing having flow characteristics selected in accordance with a desired slurry density for a discharge of the fluidizing unit, the water swirling from the liquid supply duct outlet to create a vortex in the housing which disturbs the oil and particles to cause the oil to be stripped, at least partially, from the particles received in the housing, and causes the oil and particles entrained in the water to travel into the discharge duct as a discharge slurry of the desired density, the slurry being comprised of the solid particles, the oil stripped from the particles, and the water; and
   a first separator (8) coupled to said discharge duct of said fluidizing unit for receiving the discharge slurry, said first separator comprising a liquid/solid separation hydrocyclone having an overflow outlet; and
   a second separator (14) coupled to said overflow outlet of said first separator, said second separator comprising a liquid/liquid separation hydrocyclone,
   the separation efficiency of at least one of said hydrocyclones being slurry density dependent.

10. An apparatus according to claim 9, wherein a closable gap exists between the liquid supply duct (5) and the discharge duct (6), said gap being closed when said fluidizing unit (3) is not in use.

11. An apparatus according to claim 9, further including a pump coupled to said discharge duct for boosting the pressure in said discharge duct (6).

12. An apparatus according to claim 9, wherein said inlet (7) of said discharge duct (6) projects beyond said outlet (4) of said liquid supply duct (5).

13. An apparatus for removing oil from particles coated with oil, said apparatus comprising:
   a housing (1) for receiving a slurry of coated particles, said housing containing a fluidizing unit (3) which has an axis, a liquid supply duct (5) with an outlet (4), and a discharge duct (6) extending through said liquid supply duct so that said liquid supply duct surrounds a portion of said discharge duct, the liquid supply duct having at its end an inlet (7), water being fed to the liquid supply duct under pressure from outside the housing, the outlet of the liquid supply duct and the inlet of the discharge duct being axially separated in the fluidizing unit by an amount selected in accordance with a desired slurry density for a discharge of the fluidizing unit, water being fed to the liquid supply duct under pressure from outside the housing having flow characteristics selected in accordance with a desired slurry density for a discharge of the fluidizing unit, the water swirling from the liquid supply duct outlet to create a vortex in the housing which disturbs the oil and particles to cause the oil to be stripped, at least partially, from the particles received in the housing, and causes the oil and particles entrained in the water to travel into the discharge duct as a discharge slurry, the slurry being comprised of the solid particles, the oil stripped from the particles, and the water, said housing having an overflow conduit (23); and
   a first separator (40) coupled to said discharge duct of said fluidizing unit for receiving the discharge slurry and separating the particles from the oil and water, the separation efficiency of said first separator being slurry density dependent; and
   a second, three phase, separator (26) receiving the oil and water from said first separator unit, the overflow conduit of said housing being connected to said second separator.

14. An apparatus according to claim 13, wherein said second separator is connected to said liquid supply duct for supplying liquid to said liquid supply duct.

15. An apparatus according to claim 13, wherein said housing has an upper portion and a lower portion and an inlet for receiving the slurry of coated particles, and wherein said housing includes a cyclonic separator (50, 62) coupled to said inlet, said cyclonic separator having an underflow (54, 65) which discharges particles and a quantity of liquid to the lower portion of said housing and an overflow (51, 64) which discharges oil and water, substantially free of sand, to the upper portion of said housing.

16. A separator for separating solid particles from a mixture containing solid particles and a fluid component, said separator comprising:
   a housing (1) having an upper part and a lower part, said housing having an inlet (2) for the mixture and a fluid outlet (23) associated with said upper part;
   the inlet for the mixture leading to a cyclonic separator (50, 62) such that the mixture supplied through the inlet is caused to swirl in the cyclonic separator, said cyclonic separator having an overflow (51, 64) for the discharge of fluids to said upper part of said housing, and an underflow (54, 65) for the discharge of solid particles and a portion of fluid to said lower part of said housing; and
   a fluidizing unit (3) positioned in said lower part of said housing, said fluidizing unit having a liquid supply duct (5) with an outlet (4) and arranged to be fed with liquid under pressure from outside the housing, and having a discharge duct (6) extending through said liquid supply duct so that said liquid supply duct surrounds a portion of said discharge duct, the liquid supply duct and having at its end an inlet (7) for receiving the solid particles and discharging them from the lower part of the housing.

17. A separator according to claim 16, wherein a plurality of baffles (55, 56) are provided in the housing (1) to provide a tortuous path to the upper part of the housing for any fluid discharged from the underflow (54) of the cyclonic separator (50), and to deter any solid particles discharged from the underflow of the cyclonic separator from reaching the upper part of the housing.

18. A separator according to claim 16, wherein said cyclonic separator (50) has an axis, about which said mixture swirls and wherein said cyclonic separator has a gas overflow outlet (52) provided on said axis.

19. A separator according to claim 16, wherein the housing (1) is a pressure vessel, and wherein the cyclonic separator comprises at least one hydrocyclone (62), the underflow outlet (65) of which discharges into a closed underflow chamber (61) of the pressure vessel, in which chamber the fluidizing unit (3) is provided.

20. A separator according to claim 19, further including a plurality of hydrocyclones (62), the fluid inlet (2) for the mixture opening into an inlet chamber coupled to inlets of said hydrocyclones, the overflow outlets (64) of said hydrocyclones opening into an overflow chamber (60), said inlet chamber and said overflow chamber being sealed from one another and from said underflow chamber (61).

21. A separator according to claim 19, wherein an upper part of said underflow chamber (61) is connected to an overflow outlet (69) from said housing (1), said overflow outlet being connected to said fluid outlet (23) so that the portion of fluid discharged through the hydrocyclone underflow outlet (65) into said underflow chamber (61) may be conveyed to said separated fluid outlet (23).

22. A separator according to claim 19, wherein said liquid supply duct (5) is connected to said inlet (2) for said housing for receiving liquid for supply to said liquid supply duct (5).

23. A separator according to claim 16, wherein said fluidizing unit is further defined as including means for causing the liquid leaving said liquid supply conduit (5) to swirl.

24. A separator according to claim 23, wherein said means comprises inclined vanes in said liquid supply duct (5).

25. A separator according to claim 23, wherein said fluidizing unit has a cylindrical chamber upstream of said liquid supply duct outlet and wherein said swirling means comprises a tangential inlet for said liquid supply duct (5) into said cylindrical chamber.

26. A separator according to claim 16, further including means for adding chemicals to the liquid fed to said liquid supply duct (5) of said fluidizing unit (3).

27. A separator according to claim 16, further including a sensor for sensing the amount of particles in said housing (1), whereby the fluidizing unit (3) can be operated when the amount of particles reaches a threshold value.

28. A separator according to claim 16, wherein a closable gap exists between said liquid supply duct (5) and said discharge duct (6), said gap being closed when said fluidizing unit (3) is not in use.

29. A separator according to claim 16, further including a pump coupled to said discharge duct (6) for boosting the pressure therein.

30. A separator according to claim 16, wherein said inlet (7) of said discharge duct (6) projects beyond said outlet (4) of said liquid supply duct (5).

* * * * *